Patented Dec. 31, 1940

2,226,675

UNITED STATES PATENT OFFICE 2,226,675

AZO DYESTUFFS AND PROCESS OF PRODUCING SAME

Fritz Straub, Kaiseraugst, and Walter Anderau, Basel, Switzerland, assignors to Society of Chemical Industry in Basle, Basel, Switzerland No Drawing. Application July 18, 1939, Serial No. 285,174. In Switzerland July 22, 1938

18 Claims. (Cl. 260—172)

This invention relates to the manufacture of azo dyestuffs by combining a dihydroxy-compound of the aryl series which is capable of coupling twice, on the one hand with a diazo-compound of an amine of the general formula

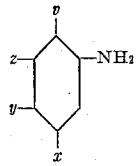

wherein $v$ represents a lake-forming group, $x$ represents hydrogen or a monovalent substituent which does not impart solubility in water, and $y$ and $z$ represent hydrogen or any monovalent substituent, and on the other hand with a diazoazo-compound obtainable by one-sided coupling of a tetrazotized diaminodiphenyl with an ortho-hydroxybenzoic acid which is capable of coupling, and if desired causing an agent which yields metal to act on the dyestuff obtained.

Among the dihydroxy-compounds of the aryl-series capable of coupling twice serving as parent materials for the invention there come into consideration principally those of the benzene-series, for example 1:3-dihydroxybenzene and substitution products thereof capable of coupling twice, such as 1:3-dihydroxybenzene-4-carboxylic acid.

As amines of the above general formula there come into consideration those in which the substituent $v$ in 1-position is for example a hydroxyl, carboxyl- or alkoxy-group, for instance a methoxy- or ethoxy-group. The substituent $x$ in 4-position which does not impart solubility in water must be so chosen that it does not give rise to the formation of salts soluble in water with weak alkalis such as alkali-carbonates in the cold, as would be the case for example with a carboxyl or a sulfonic acid group. It may, however, have a negative character as is the case for example with a nitro- or sulfamide-group or a halogen. The substituents $y$ and $z$ which in some cases may be present in 5- or 6-position may be of any kind; they may be for example sulfonic acid, carboxyl-, nitro- or alkyl-groups, for example methyl-groups, as well as groups derived from these groups; or they may be halogens, such as chlorine or bromine. It is advantageous that there should be present in 4- or 5-position a substituent having a negative character.

The amines of the above general formula, diazotized in the usual manner, are advantageously combined in a first operation with the aforesaid aryl-derivative capable of coupling twice; this combination may occur for example in a medium alkaline with alkali carbonate.

The diazoazo-compounds required as further diazo-components are obtained by one-sided coupling of tetrazotized diaminodiphenyls with ortho-hydroxybenzoic acids capable of coupling. The tetrazotized diaminodiphenyl may be for example a tetrazo-compound of benzidine (4:4'-diaminodiphenyl) or a substitution product thereof, for example a 3:3'-dimethyl-, 3:3'-dihalogen- or 3:3'-dimethoxy-4:4'-diaminodiphenyl; or it may be a tetrazo compound of another 4:4'-diaminodiphenyl, for example one which is substituted in 2-position. As ortho-hydroxy-benzoic acids capable of coupling there come into consideration for example salicylic acid (2-hydroxy-1-benzoic acid) and ortho-cresotinic acid (3-methyl-2-hydroxy-1-benzoic acid). The one-sided coupling of these ortho-hydroxybenzoic acids with the tetrazotized diaminodiphenyls is conducted in a separate stage, for example in a medium alkaline with alkali carbonate.

The diazoazo-compounds so obtained can then be coupled with the above described azo-compounds capable of coupling; if required this coupling may be conducted in a medium alkaline with alkali carbonate.

In some cases, however, the reverse procedure is possible. Thus the diazoazo-compound from the tetrazotized diaminodiphenyl and the ortho-hydroxybenzoic acid may be combined with one of the aforesaid dihydroxy-aryls and a diazotized amine of the above general formula may then be combined with the resulting disazo-compound capable of coupling.

The products so obtained dye fibers containing cellulose, such as cotton and other vegetable fibers, as well as artificial silk and cellulose wool from regenerated cellulose according to the methods usual for dyeing with direct dyestuffs and yield principally brown shades.

Particularly valuable products are obtained by treating the dyestuffs obtained as above described with an agent yielding metal, for example an agent yielding chromium, iron, cobalt, nickel or especially copper, in substance, in the dye bath or on the fiber. The treatment of the dyestuff in substance with an agent yielding metal may be conducted according to known methods in an alkaline, neutral or acid medium, with or without suitable additions such as common salt, an acetate or a tartrate, in presence or absence of a suitable organic solvent or diluent such as alcohol, glycerine or pyridine, and in an open vessel or under pressure. The dyestuffs so obtained are as a rule sparingly soluble or insoluble in cases in which all groups in the dyestuff molecule which are capable of being metallized are saturated with metal; they may be dyed for example according to the process of U. S. Patent No. 2,092,429.

It is very advantageous to conduct the treatment of the dyestuff with the agent yielding metal, especially an agent yielding copper, in the dye bath or still better on the fibre. For this purpose there may be used the customary copper salts such as copper sulfate, if required in a neutral bath or in a bath weakly acid with acetic acid, or more advantageously with copper compounds which are stable towards alkalis, such as are obtainable for example by reaction of the customary copper salts with aliphatic hydroxycarboxylic acid, such as tartaric acid, in an alkaline medium, for instance a medium alkaline with alkali carbonate. A dyeing process in which such coppering agents are used is described for example in U. S. Patent No. 2,148,659. Both the dyeing and the treatment with an agent yielding copper may be conducted in a bath which is alkaline with alkali carbonate. It is however also possible to conduct one or both of the said operations in a bath alkaline with caustic alkali, since under these conditions the reaction products of copper salts with tartaric acid for example are not split hydrolytically or are split only to an inappreciable extent with the separation of copper oxide. In all these cases the after-treatment with the metallizing agent, especially the coppering agent, may be conducted in the dye bath or in a fresh bath.

Finally it is also possible to convert in substance the trisazo dyestuffs free from metal obtainable in accordance with the invention into the corresponding metal compounds, for instance copper compounds, only partially, for example only in respect of the orthohydroxyazo-group, to use these incompletely metallized dyestuffs for dyeing and then to treat the resulting dyeings with metallizing agents, especially agents yielding copper, for example with use of the process described in U. S. patent application Serial No. 214,576, filed June 18, 1938.

According to the processes described above there are obtained on fibers containing cellulose principally brown shades of good fastness to washing and light.

The following examples illustrate the invention, the parts being by weight:

*Example 1*

18.4 parts of benzidine are dissolved in 80 parts of water with the aid of 25 parts of hot concentrated hydrochloric acid and the solution is poured in to ice. After addition of a further 25 parts of hydrochloric acid the tetrazo-compound is prepared by the addition of 14 parts of sodium nitrite. The tetrazo-solution is allowed to run into a solution, cooled to 4° C., of 16 parts of salicylic acid and 55 parts of sodium carbonate in 500 parts of water. There is quickly formed a yellow-orange suspension of the diazoazo-compound of the constitution:

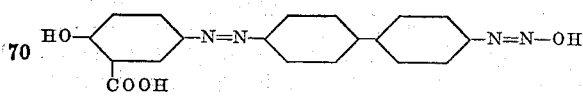

The formation of this intermediate product is completed in 30–60 minutes. Meanwhile 18.8 parts of 2-amino-1-hydroxybenzene-4-sulfamide are dissolved in 300 parts of water with the aid of 25 parts of concentrated hydrochloric acid and the solution is diazotized at 5° C. by addition of 7 parts of sodium nitrite. The diazo suspension so obtained is coupled with a solution of 11 parts of resorcinol in 250 parts of sodium carbonate solution of 10 per cent. strength. The red solution of the mono-azo dyestuff from resorcinol and ortho-aminophenol-sulfamide is then allowed to run into the suspension of the yellow-orange intermediate product described above, whereby in the course of some hours a brown dyestuff is formed. This dyestuff separates as a sparingly soluble precipitate; after 15 hours it is heated to 60° C. whereby it passes into a form in which it can easily be filtered. It is filtered, washed with sodium chloride solution and dried. There is obtained a blackish powder of the formula

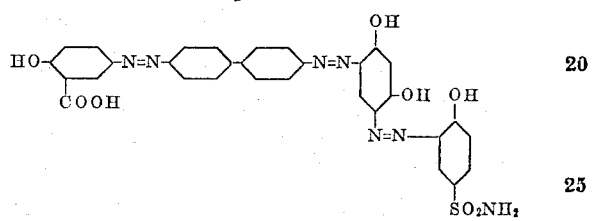

which is soluble in water and in dilute alkalis to orange-brown solutions and in concentrated sulfuric acid solutions to a violet solution. It dyes vegetable fibres and artificial silks of regenerated cellulose in a Glauber salt bath orange-brown shades which by after-treatment with copper salts become full brown shades of excellent fastness to light and to washing.

If 18 parts of ortho-cresotinic acid are used instead of 16 parts of salicylic acid there is obtained a dyestuff of similar shade and practically the same properties.

If for preparing the monoazo dyestuff from 1:3-dihydroxybenzene there are used instead of 18.8 parts of 1-hydroxy-2-aminobenzene-4-sulfamide 15.4 parts of 4-nitro-2-amino-1-hydroxybenzene or 14.3 parts of 4-chloro-2-amino-1-hydroxybenzene or 22.3 parts of 4-chloro-2-amino-1-hydroxybenzene-6-sulfonic acid or 23.4 parts of 4-nitro-2-amino-1-hydroxybenzene-6-sulfonic acid and the procedure is otherwise as described above, there are likewise obtained brown dyestuffs having very similar properties.

*Example 2*

18.4 parts of benzidine are tetrazotized in 400 parts of water by means of 50 parts of hydrochloric acid and 14 parts of sodium nitrite and the resulting solution is allowed to run into a solution of 18 parts of ortho-cresotinic acid and 55 parts of sodium carbonate in 500 parts of water having a temperature of 5° C. Within 30–60 minutes there is formed a brown-orange suspension of the diazoazo compound of the formula

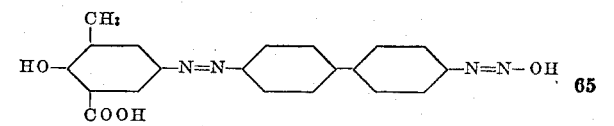

Meanwhile there is prepared the monoazo-compound from diazotized 4-chloro-2-amino-1-hydroxybenzene and resorcinol by dissolving 14.5 parts of 4-chloro-2-amino-1-hydroxybenzene in 300 parts of water with the aid of 25 parts of concentrated hydrochloric acid, diazotized at 5° C. with 7 parts of sodium nitrite and allowing the resulting diazo compound to run into a solution of 11 parts of resorcinol and 25 parts of sodium carbonate in 300 parts of water at 5° C. The solution of the monoazo dyestuff thus prepared is then added to the above suspension of the diazoazo-compound and the whole is well stirred. In the course of some hours there is obtained a suspension of a uniform brown dyestuff; after 15–20 hours it is heated to 65° C. whereby it becomes capable of being easily filtered. It is filtered, washed with sodium chloride solution and dried. There is obtained a blackish powder of the formula

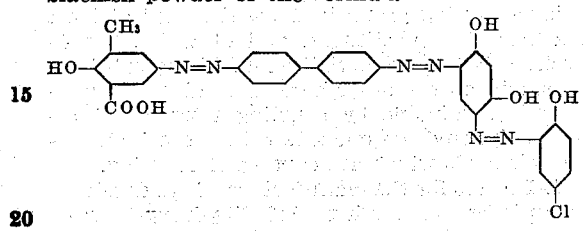

which is soluble in water and in dilute alkalis to orange-brown solutions and in concentrated sulfuric acid to a violet solution. It dyes vegetable fibers and artifical silks of regenerated cellulose in a Glauber salt bath yellowish-brown shades which become fuller and fast to light and washing when after-treated with copper salts.

When using instead of 4-chloro-2-amino-1-hydroxybenzene the equivalent quantity of 4-bromo-2-amino-1-hydroxybenzene there is obtained a dyestuff which has very similar properties.

Example 3

21.2 parts of 3:3'-dimethyl-4:4'-diamino-diphenyl are suspended in 400 parts of water and 50 parts of concentrated hydrochloric acid at 4° C. and tetrazotized with 14 parts of sodium nitrite. The resulting solution is allowed to run into a solution of 16 parts of salicylic acid and 55 parts of sodium carbonate in 350 parts of water at a temperature of 4° C. There is formed a brown-orange diazoazo-compound of the formula

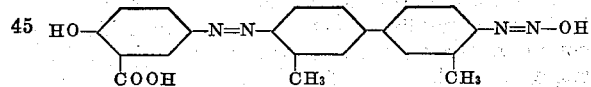

Meanwhile 18.8 parts of 2-amino-1-hydroxybenzene-4-sulfamide are dissolved in 300 parts of water with the aid of 25 parts of concentrated hydrochloric acid and diazotized at 4° C. with 7 parts of sodium nitrite and the diazo-compound so obtained is combined at 4–6° C. with a solution of 11 parts of resorcinol in 300 parts of water and 25 parts of sodium carbonate. The solution of the monoazo dyestuff from resorcinol and 2-amino-1-hydroxybenzene-4-sulfamide thus prepared is allowed to run into the diazoazo-compound prepared as above described and the whole is well stirred. In the course of several hours a uniform brown dyestuff suspension is formed. After 24 hours it is heated to 65° C. to obtain the dyestuff in a form in which it can easily be filtered. The dyestuff is then filtered and dried. There is obtained a blackish powder of the formula

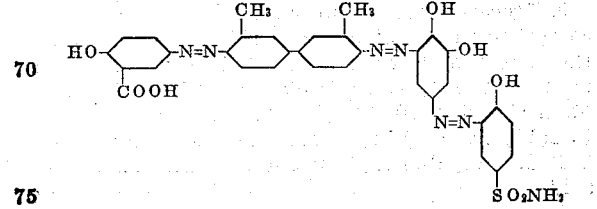

which is soluble in water and in dilute alkalis to red-brown solutions and in concentrated sulfuric acid to a red blue solution. It dyes vegetable fibres and artificial silks of regenerated cellulose in a Glauber salt bath brown shades which become fuller and fast to light and washing when after-treated with copper salts.

Instead of 18.8 parts of 2-amino-1-hydroxybenzene-4-sulfamide there may be used in this example an equivalent quantity, that is to say 15.4 parts of 4-nitro-2-amino-1-hydroxybenzene or 23.4 parts of 4-nitro-2-amino-1-hydroxybenzene-6-sulfonic acid. Dyestuffs having similar properties are thus obtained.

Example 4

24.4 parts of 3:3'-dimethoxy-4:4'-diamino-diphenyl are suspended in 300 parts of water and 50 parts of concentrated hydrochloric acid and converted into the tetrazonium compound by means of 14 parts of sodium nitrite. The tetrazonium compound is allowed to flow into a solution of 18 parts of ortho-cresotinic acid and 55 parts of sodium carbonate in 400 parts of water maintained at a temperature of 4° C. There is formed a brownish diazoazo-compound of the formula

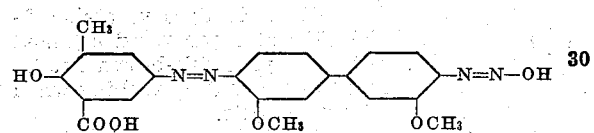

To the suspension of this diazoazo-compound is added the red solution, prepared as described in Example 1, of the monoazo-dyestuff from resorcinol and diazotized 2-amino-1-hydroxybenzene-4-sulfamide, whereby in the course of several hours a uniform trisazo dyestuff is formed. After the whole has been stirred for 24 hours it is heated to 65° C. and the dyestuff is filtered and dried. It is a blackish powder of the formula

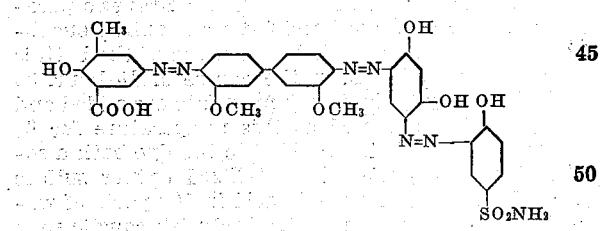

soluble in water and in dilute sodium carbonate solution to brownish solutions, in dilute caustic soda solution to a red solution and in concentrated sulfuric acid to a red-blue solution. It dyes vegetable fibres and artificial silks of regenerated cellulose in a Glauber salt bath brown-red shades which become fast to light and to washing when after-treated with copper salts.

If in this example 16 parts of salicylic acid are used instead of 18 parts of ortho-cresotinic acid a dyestuff having practically the same properties is obtained.

Example 5

21.2 parts of 3:3'-dimethyl-4:4'-diamino-diphenyl are suspended in 400 parts of water and 50 parts of concentrated hydrochloric acid at a temperature of 10° C. and converted into the tetrazonium compound by means of 14 parts of sodium nitrite. The solution of the tetrazonium compound is allowed to run into a solution of 16 parts of salicylic acid and 55 parts of sodium carbonate in 500 parts of water maintained at a temperature of 4° C. After a short time the brown diazoazo-compound of the formula

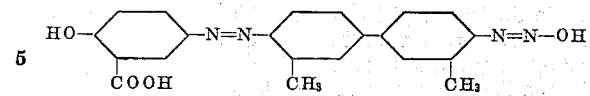

has separated. Into the suspension of this diazoazo-compound is allowed to run the solution, prepared as described in Example 2, of the monoazo dyestuff from resorcinol and diazotized 4-chloro-2-amino-1-hydroxybenzene, whereby in the course of several hours a uniform trisazo dyestuff is formed. After 20 hours the suspension is heated to 60° C. and the dyestuff is filtered and dried. There is obtained a black powder of the formula

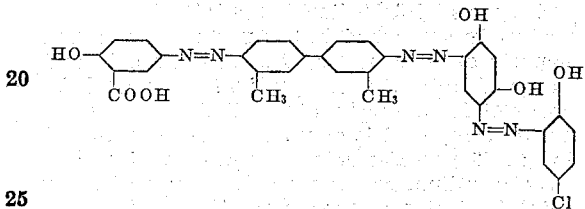

soluble in water and in dilute alkalis to yellow-brown solutions and in concentrated sulfuric acid to a blue-violet solution. It dyes vegetable fibres and artificial silks of regenerated cellulose in a Glauber salt bath yellowish-brown shades which become fast to light and to washing when after-treated with copper salts.

When using instead of 4-chloro-2-amino-1-hydroxybenzene the equivalent quantity of 4-bromo-2-amino-1-hydroxybenzene there is obtained a dyestuff which has very similar properties.

*Example 6*

100 parts of cotton are introduced into a dye bath having a temperature of 40–50° C. and composed of 3000 parts of water, 1.5 parts of the dyestuff prepared as described in the first two paragraphs of Example 1 and 2 parts of anhydrous sodium carbonate. The temperature of the bath is raised to 90–95° C. in the course of ½ hour, 30 parts of crystallized sodium sulfate are added and dyeing is conducted at this temperature for ¾ hour. There is then added to the dye bath a solution of 2 parts of crystallized copper sulfate and 2.5 parts of tartaric acid in 100 parts of water which has been neutralized with caustic soda solution and the cotton is further treated for ½ hour at about 95° C. It is then rinsed and dried as usual. The cotton is thus dyed fast brown shades.

What we claim is:

1. Process for the manufacture of azo dyestuffs, comprising combining dihydroxy-benzenes which are capable of coupling twice, on the one hand with diazotized amines of the benzene series which have the diazonium group in 2-position and a lake-forming group in 1-position, and of which the 4-position is free from water-solubilizing substituents, and on the other hand with diazoazo-compounds obtainable by coupling tetrazotized diaminodiphenyls on one side with ortho-hydroxybenzoic acids which are capable of coupling.

2. Process for the manufacture of azo dyestuffs, comprising combining 1:3-dihydroxy-benzenes which are capable of coupling twice, on the one hand with diazotized amines of the benzene series which have the diazonium group in 2-position and a lake-forming group in 1-position, and of which the 4-position is free from water-solubilizing substituents, and on the other hand with diazoazo-compounds obtainable by coupling tetrazotized diaminodiphenyls on one side with ortho-hydroxybenzoic acids which are capable of coupling.

3. Process for the manufacture of azo dyestuffs, comprising combining 1:3-dihydroxy-benzene which are capable of coupling twice, on the one hand with diazotized amines of the benzene series which have the diazonium group in 2-position, a lake-forming group in 1-position and at least one negative substituent, and of which the 4-position is free from water-solubilizing substituents, and on the other hand with diazoazo-compounds obtainable by coupling tetrazotized diaminodiphenyls on one side with ortho-hydroxybenzoic acids which are capable of coupling.

4. Process for the manufacture of azo dyestuffs, comprising combining 1:3-dihydroxy-benzene on the one hand with diazotized amines of the benzene series which have the diazonium group in 2-position, a hydroxyl group in 1-position and a substituent selected from the group consisting of $SO_2NH_2$, $NO_2$, Cl and Br in 4-position, and on the other hand with diazoazo-compounds obtainable by coupling tetrazotized diaminodiphenyls on one side with ortho-hydroxybenzoic acids which are capable of coupling.

5. Process for the manufacture of azo dyestuffs, comprising combining 1:3-dihydroxy-benzene on the one hand with diazotized amines of the benzene series which have the diazonium group in 2-position, a hydroxyl group in 1-position and a substituent selected from the group consisting of $SO_2NH_2$, $NO_2$, Cl and Br in 4-position, and on the other hand with diazoazo-compounds obtainable by coupling tetrazotized benzidine on one side with ortho-hydroxybenzoic acids which are capable of coupling.

6. Process for the manufacture of azo dyestuffs, comprising combining 1:3-dihydroxy-benzene on the one hand with diazotized 1-hydroxy-2-aminobenzene-4-sulfamide and on the other hand with the diazoazo-compound obtainable by coupling tetrazotized benzidine on one side with salicyclic acid.

7. Process for the manufacture of azo dyestuffs, comprising combining 1:3-dihydroxy-benzene on the one hand with diazotized amines of the benzene series which have the diazonium group in 2-position, a hydroxyl group in 1-position and a substituent selected from the group consisting of $SO_2NH_2$, $NO_2$, Cl and Br in 4-position, and on the other hand with diazoazo-compounds obtainable by coupling tetrazotized 4:4'-diamino-3:3'-dimethyldiphenyl on one side with ortho-hydroxybenzoic acids which are capable of coupling.

8. Process for the manufacture of azo dyestuffs, comprising combining 1:3-dihydroxybenzene on the one hand with diazotized 1-hydroxy-2-amino-4-nitrobenzene and on the other hand with the diazoazo-compound obtainable by coupling tetrazotized 4:4'-diamino-3:3'-dimethyldiphenyl on one side with salicyclic acid.

9. Process for the manufacture of azo dyestuffs, comprising combining 1:3-dihydroxybenzene on the one hand with diazotized 1-hydroxy-2-amino-4-nitrobenzene-6-sulfonic acid and on the other hand with the diazoazo-compound obtainable by coupling tetrazotized 4:4'-diamino-3:3'-dimethyldiphenyl on one side with salicylic acid.

10. Azo dyestuffs of the general formula

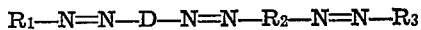

wherein R₁ stands for the radical of an ortho-hydroxybenzoic acid, D stands for a diphenyl radical, R₂ stands for the radical of a dihydroxy-benzene capable of coupling twice, and R₃ stands for a benzene radical which has the azo-group linked in 2-position, a lake-forming group in 1-position and of which the 4-position is free from water-solubilizing substituents.

11. Azo dyestuffs of the general formula

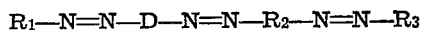

wherein R₁ stands for the radical of an ortho-hydroxy-benzoic acid, D stands for a diphenyl radical, R₂ stands for the radical of a 1:3-dihydroxy-benzene, and R₃ stands for a benzene radical which has the azo-group linked in 2-position, a lake-forming group in 1-position and in which the 4-position is free from water-solubilizing substituents.

12. Azo dyestuffs of the general formula

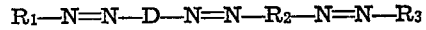

wherein R₁ stands for the radical of an ortho-hydroxy-benzoic acid, D stands for a diphenyl radical, R₂ stands for the radical of a 1:3-dihydroxy-benzene, and R₃ stands for a benzene radical which has the azo-group linked in 2-position, a lake-forming group in 1-position and at least one negative substituent, and of which the 4-position is free from water-solubilizing substituents.

13. Azo dyestuffs of the general formula

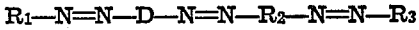

wherein R₁ stands for the radical of an ortho-hydroxy-benzoic acid capable of coupling, D stands for a diphenyl radical, R₂ stands for the radical of 1:3-dihydroxy-benzene and R₃ stands for a benzene radical which has the azo-group linked in 2-position, a hydroxyl group in 1-position and a substituent selected from the group consisting of SO₂NH₂, NO₂, Cl and Br in 4-position.

14. Azo dyestuffs of the general formula

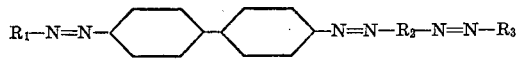

wherein R₁ stands for the radical of an ortho-hydroxy-benzoic acid capable of coupling, R₂ stands for the radical of 1:3-dihydroxy-benzene and R₃ stands for a benzene radical which has the azo-group linked in 2-position, a hydroxyl group in 1-position and a substituent selected from the group consisting of SO₂NH₂, NO₂, Cl and Br in 4-position.

15. The azo dyestuff of the formula

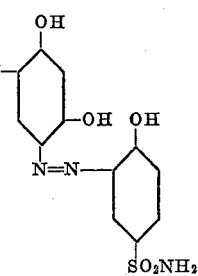
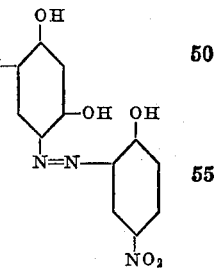

16. Azo dyestuffs of the general formula

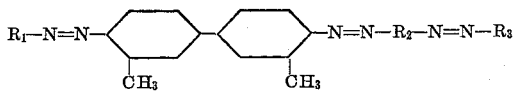

wherein R₁ stands for the radical of an ortho-hydroxy-benzoic acid capable of coupling, R₂ stands for the radical of 1:3-dihydroxy-benzene and R₃ stands for a benzene radical which has the azo-group linked in 2-position, a hydroxyl group in 1-position and a substituent selected from the group consisting of SO₂NH₂, NO₂, Cl and Br in 4-position.

17. The azo dyestuff of the formula

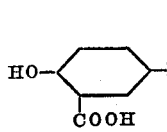
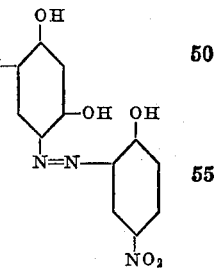

18. The azo dyestuff of the formula

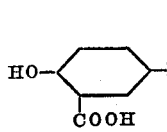
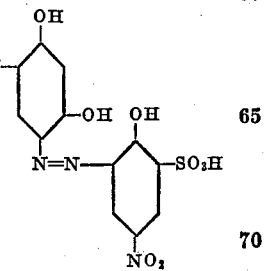

FRITZ STRAUB.
WALTER ANDERAU.